United States Patent
Cornu et al.

(10) Patent No.: US 9,804,017 B2
(45) Date of Patent: Oct. 31, 2017

(54) METHOD FOR WEIGHING A VEHICLE, AND MEASURING SYSTEM AND MEASURING ARRANGEMENT THEREFOR

(71) Applicant: KISTLER HOLDING AG, Winterhur (CH)

(72) Inventors: David Cornu, Bellinzona (CH); Adrian Hofmann, Ellikon am Rhein (CH)

(73) Assignee: KISTLER HOLDING AG, Winterhur (CH)

( * ) Notice: Subject to any disclaimer, the term of this patent is extended or adjusted under 35 U.S.C. 154(b) by 805 days.

(21) Appl. No.: 14/353,327

(22) PCT Filed: Nov. 2, 2012

(86) PCT No.: PCT/CH2012/000247
§ 371 (c)(1),
(2) Date: Jun. 26, 2014

(87) PCT Pub. No.: WO2013/063710
PCT Pub. Date: May 10, 2013

(65) Prior Publication Data
US 2014/0309966 A1    Oct. 16, 2014

(30) Foreign Application Priority Data
Nov. 4, 2011    (CH) ........................................ 1780/11

(51) Int. Cl.
    *G01G 19/02*    (2006.01)
(52) U.S. Cl.
    CPC ........... *G01G 19/022* (2013.01); *G01G 19/02* (2013.01); *G01G 19/024* (2013.01); *G01G 19/025* (2013.01)

(58) Field of Classification Search
USPC ........................................................ 702/175
See application file for complete search history.

(56) References Cited

U.S. PATENT DOCUMENTS

| | | | |
|---|---|---|---|
| 4,597,151 | A | 7/1986 | Zaghi et al. |
| 5,265,481 | A | 11/1993 | Sonderegger et al. |

(Continued)

FOREIGN PATENT DOCUMENTS

| | | |
|---|---|---|
| CH | 394637 | 6/1965 |
| CH | 702257 | 5/2011 |

(Continued)

OTHER PUBLICATIONS

Hallenbeck, M., and Weinblatt, H. NCHRP Report 509: Equipment for Collecting Traffic Load Data [online], Jan. 2004 [retrieved on Mar. 18, 2017]. Retrieved from the Internet: <http://www.is-wim.org/doc/nchrp_rpt_509.pdf>.*

(Continued)

*Primary Examiner* — Paul D Lee
(74) *Attorney, Agent, or Firm* — Dority & Manning, P.A.

(57) ABSTRACT

A method for determining the weight G of a vehicle (1) while the vehicle is travelling on a section (3) of road (4) uses at least one weigh-in-motion (WIM) sensor (5) that is narrower than the length of the footprint of a wheel in the direction of vehicle travel. When the vehicle (1) travels along this section (3) of road (4) both the wheel loads $F_i(t)$ of all the wheels (2) or twin wheels i, and the speed $v_i(t)$ of the vehicle (1) during the entire passing are acquired as time functions, and during evaluation of the data for determining the weight G the speeds $v_i(t)$ and their change over time are used as weighting of the simultaneously determined wheel loads $F_i(t)$.

18 Claims, 2 Drawing Sheets

(56) References Cited

U.S. PATENT DOCUMENTS

| | | |
|---|---|---|
| 5,345,428 A | 9/1994 | Arnold et al. |
| 5,461,924 A | 10/1995 | Calderara et al. |
| 5,501,111 A | 3/1996 | Sonderegger et al. |
| D370,423 S | 6/1996 | Nagai et al. |
| D370,424 S | 6/1996 | Nagai et al. |
| D373,738 S | 9/1996 | Nagai et al. |
| D386,431 S | 11/1997 | Nagai et al. |
| D386,702 S | 11/1997 | Nagai et al. |
| 5,717,390 A | 2/1998 | Hasselbring |
| 5,942,681 A | 8/1999 | Vollenweider et al. |
| 6,459,050 B1 | 10/2002 | Muhs et al. |
| D469,886 S | 2/2003 | Barnett |
| 6,595,064 B2 | 7/2003 | Drewes et al. |
| D550,861 S | 9/2007 | Brabeck et al. |
| 7,423,225 B1 | 9/2008 | Kroll et al. |
| D684,075 S | 6/2013 | Cornu |
| D686,928 S | 7/2013 | Cornu |
| 2002/0014124 A1 | 2/2002 | Drewes et al. |
| 2009/0174575 A1* | 7/2009 | Allen .................. G07B 15/063 340/933 |
| 2011/0127090 A1* | 6/2011 | Vijayaraghavan ..... G01G 19/03 177/133 |
| 2011/0232974 A1 | 9/2011 | Abercrombie et al. |

FOREIGN PATENT DOCUMENTS

| | | |
|---|---|---|
| EP | 0259523 | 3/1988 |
| EP | 0491655 | 6/1992 |
| EP | 0 654 654 | 4/1995 |
| EP | 0 892 259 | 1/1999 |
| WO | WO 01/22044 A1 | 3/2001 |
| WO | WO 02/08712 | 1/2002 |
| WO | WO 03/071242 | 8/2003 |

OTHER PUBLICATIONS

International Search Report for PCT/CH2013/000005, dated Feb. 11, 2013.
International Preliminary Report on patentability for PCT/CH2012/000149, dated Jan. 7, 2014.
International Search Report for PCT/CH2012/000134, dated Jul. 31, 2012.
International Preliminary Report on Patentability and Written Opinion for PCT/CH2012/000247, dated May 6, 2014.
International Search Report for PCT/CH2012/000251, dated Mar. 13, 2013.
J. Boby, S. Teral, J.M. Caussignac and M. Siffert, "Vehicle Weighing in Motion with Fibre Optic Sensors", pp. 45-47, Measurement + control, vol. 26, Mar. 1993.
International Search Report, dated Jan. 30, 2013.

* cited by examiner

METHOD FOR WEIGHING A VEHICLE, AND MEASURING SYSTEM AND MEASURING ARRANGEMENT THEREFOR

CROSS-REFERENCE TO RELATED APPLICATIONS

This application claims priority to International Application Serial No. PCT/CH2012/000247, filed Nov. 2, 2012, which claims priority to Swiss Application No. 1780/11 filed Nov. 4, 2011. International Application Serial No. PCT/CH2012/000247 is hereby incorporated herein for all purposes by this reference.

FIELD OF THE INVENTION

The invention relates to a method for determining the weight G of a vehicle while it is travelling on a section of road.

BACKGROUND

In the context of applications in the field of toll fee collection for lorries and check-in systems at toll plazas, very accurate and efficient weighing systems for lorries are used in order to be able to impose charges based on vehicle weight. In this process it is desirable that measuring can take place in moving traffic, without stopping the traffic. Weight measuring is then used to calculate the charge (toll charge).

At present three technical solutions for weight acquisition are known, namely static weighbridges, low-speed axle load scales, and high-speed WIM (weigh-in-motion) systems.

Weighbridges are static measuring systems. In order to weigh a lorry, it needs to drive onto the weighing pad, stop thereon, and wait for the display to stabilise. While the process is very accurate, it is, however, unfortunately also very time-consuming and not suitable for weighing in moving traffic.

Low-speed axle load scales are short weighbridges, about one meter in length, that can efficiently and accurately measure an axle load if a vehicle moves over said scales steadily and slowly. These scales are associated with disadvantages, on the one hand as a result of expensive installation because a large pit has to be dug and secured, which involves closure of a lane for several days, and on the other hand as a result of the very significant expenditure arising from intensive maintenance. Furthermore, the speed range of lorries passing over such scales is limited to approximately 10 to a maximum of 30 km/h.

High-speed WIM (weigh-in-motion) systems comprise small rail-like sensors, as known from U.S. Pat. No. 5,461,924, which is hereby incorporated herein for all purposes by this reference. These sorts of WIM sensors are quickly and easily installed in the roadway. The WIM sensors are installed in a small groove with maximum dimensions of 60×70 mm and are sealed in the roadway. Closure of the lane takes place for less than 8 hours. These systems are also maintenance-free and are successfully used in the area of high-speed WIM, where vehicles normally move at highway or motorway speeds. However, when passing at low speeds, in particular at irregular speeds, when accelerating, when decelerating during passing, and in stop-and-go traffic the accuracy of weight measuring is no longer maintained; substantial measuring errors occur. In these applications such systems cannot successfully be used.

U.S. Pat. No. 6,459,050, which is hereby incorporated herein for all purposes by this reference, proposes a method for improving readings that were carried out with a static weighing system, wherein the vehicles are to be weighed while travelling at a speed of approximately 16 km/h. The speed of vehicles when passing over the scales represents a big problem, because at high speeds the vehicles remain only a short time on the scales, and conventional weighing systems are only approximately 60 cm wide. Vehicle oscillations when passing over the scales result in substantial inaccuracies because the vehicles remain on the weighing system only for a few milliseconds. Furthermore, the sensitivity of the weighing system is not constant along the entire passing length, which again reduces the measuring accuracy. While in the case of very short weighing systems a constant speed can be assumed, in the above-mentioned printed publication for these reasons it is proposed that the measured weights be multiplied by the actually-measured speeds, and the product be integrated over that time. In this manner the errors are corrected. However, care must be taken in these systems that the length of the weighing system is always sufficiently long. Instead of the passing length of 60 cm of known weighing systems it is proposed that the length be such that in each case at least two axles of a vehicle can be situated on the weighing system at the same time. Such systems are very complex to install and very expensive.

BRIEF SUMMARY OF THE INVENTION

It is the object of the present invention to state a method for determining the weight G of a vehicle travelling on a section of a road, which method irrespective of the passing speed furnishes accurate information. In particular, the vehicle should also be able to come to a standstill on the measuring section or travel along the measuring section at motorway speed without this resulting in the loss of accuracy. Furthermore, the measuring arrangement for implementing the method is to be economical. Further objects of the invention consist of stating a measuring device and a measuring chain for it.

The object is met as explained more fully below.

The inventive step on which the invention is based is as follows: when a vehicle travels along a section of road, both the wheel loads $F_i(t)$ of all the wheels i are acquired by means of WIM sensors, and the speed v(t) of the vehicle during the entire passing is acquired, as time functions, and during evaluation of the data for determining the weight G, the speeds and their change over time are used as weighting of the simultaneously determined wheel loads. According to the invention, in this arrangement a WIM sensor is used which in the direction of travel is narrower than the length of the footprint of a wheel.

The measuring system according to the invention for determining the weight G of a vehicle while it is travelling on a section of road, taking into account the speed of the vehicle and its changes over time during determination of the weight comprises at least one WIM sensor for installation in a section of road of a roadway, which WIM sensor can acquire passing wheel loads in a time-dependent manner. Furthermore, said measuring system according to the invention comprises a device for determining the speed of a vehicle as a time function while it is travelling on a section of road, as well as an evaluation unit for evaluating the determined data. According to the invention, in this arrangement a WIM sensor is used which in the direction of travel is narrower than the length of the footprint of a wheel.

The measuring arrangement according to the invention for determining the weight G of a vehicle while it Is travelling on a section of road comprises a measuring system according to the invention, wherein the WIM sensor is installed in a road across the direction of travel so that the surface of said sensor is flush with the road surface. According to the invention, in this arrangement a WIM sensor is used which in the direction of travel is narrower than the length of the footprint of a wheel.

Hereinafter the term "WIM sensor" always relates to a sensor that is narrower than a typical length of the footprint of a wheel, as is shown in FIG. 1. Approximately 5-7 cm width or passing length are typical values.

In contrast to the method mentioned in the state of the art, the present invention does not use a wide weighing system but instead a narrow weigh-in-motion (WIM) sensor. This results in a difference in that in the present method according to the invention it is not possible to measure the weight of the vehicle or of a vehicle wheel as an entity, because no static weighing system with the corresponding length of more than one length of the footprint of a wheel is used. In the state of the art in each case a weighing system with a passing length of at least 60 cm is used; in other words clearly longer than the length of the footprint of a wheel. Since in the present invention in each case only part of the wheel rests on the WIM sensor, the wheel loads are measured, thus in each case partial loads that can never comprise the entire weight of the wheel or twin wheel.

In contrast to the method according to the state of the art, with the method stated in the invention it is possible to determine the weights of vehicles at passing speeds up to motorway speed, wherein, in particular, speeds with the vehicle in reverse are also capable of being used in the method. Thus, slight backwards rolling, as can definitely happen after a standstill, is also capable of being used in the method.

This invention provides an advantage, in particular, in that the method is universally applicable and furnishes reliable values in respect of all vehicles. This is a prerequisite in automatically levying a toll for travelling on a roadway.

BRIEF DESCRIPTION OF THE DRAWINGS

Below, the invention is explained in more detail with reference to the drawings. The following are shown.

DESCRIPTION OF EXEMPLARY EMBODIMENTS OF THE INVENTION

Figure 1:
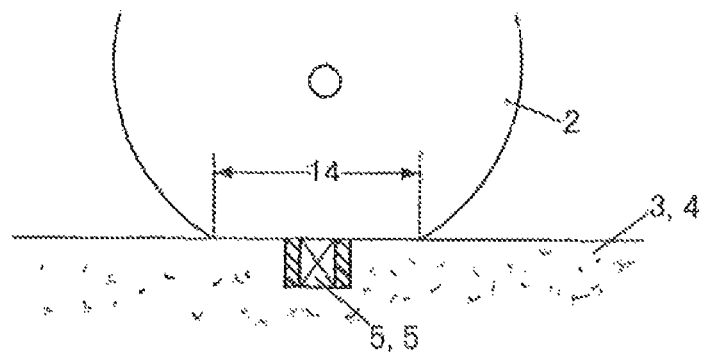
FIG. 1 a diagrammatic section view of a section of road with an installed WIM sensor, and a wheel of a vehicle while it passes over the sensor.

FIG. 1 shows a WIM sensor 5, installed in a section of road 3, and a wheel 2 of a vehicle 1 (FIG. 4) while driving over the WIM sensor 5. The diagram shows in an exaggerated manner that the wheel 2 as a result of the load of the lorry 1 does not contact the road 4 in a point-shaped manner, but instead is somewhat flattened. As a rule, the WIM sensor 5 has a width of 50-70 mm, with the typical contact surface of a lorry wheel, depending on the diameter and air pressure of the wheel, comprising a length 14 of approximately 100-200 mm.

Figure 2:
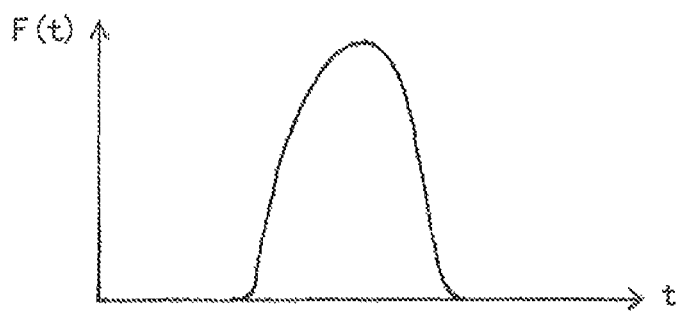
FIG. 2 an acquired time-dependent signal of a wheel load $F(t)$.

FIG. 2 shows the time-dependent wheel load $F_i(t)$ of the wheel 2 $i$, which wheel load has been acquired by the WIM sensor 5. In this arrangement the wheel i can be a wheel or a twin wheel, wherein both wheels 2 of a twin wheel, which are installed on the same side of an axle of a vehicle 1, together move over the WIM sensor 5. A twin wheel 2 is treated in the same manner as a single wheel 2, and there is no differentiation. Consequently, this document simply refers to wheels 2, although twin wheels 2 are also included.

Figure 3:
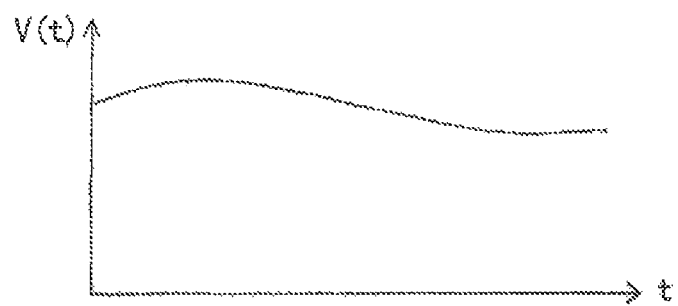
FIG. 3 an acquired time-dependent speed $v(t)$ of the vehicle while passing over the WIM sensor.

FIG. 3 shows the time-dependent speed reading of the vehicle 2 $v(t)$ that has been measured simultaneously with the wheel load reading $F(t)$. For this purpose the measured data sets $F(t)$ and $v(t)$ need to be precisely synchronised in time, and therefore the times t in both data sets $F(t)$ and $v(t)$ need to be identical at all times.

Figure 4:
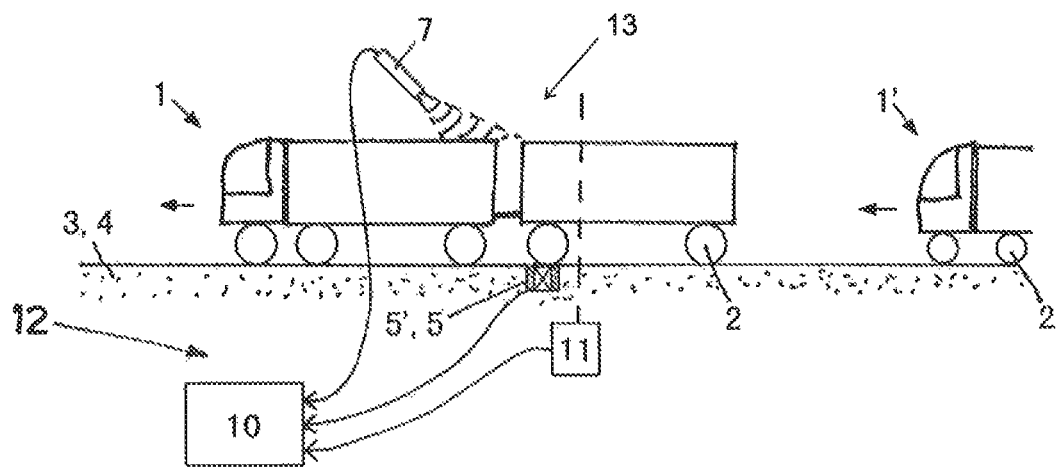
FIG. 4 a measuring arrangement according to the invention with vehicles that travel along the section of road.

FIG. 4 shows a section of road 3 and a measuring system 12 according to an embodiment of the invention for determining the vehicle weight G of a vehicle composition 1 travelling on the section of road 3. The measuring system 12 comprises a WIM sensor 5 for determining the wheel loads $F(t)$, a device 7 for determining the speed $v(t)$ and an evaluation unit 10 for evaluating the acquired data and for determining the weight G of the vehicle composition 1. FIG. 4 shows, in particular, the measuring system 12 according to an embodiment of the invention in its installed state, which results in the measuring arrangement 13 according to an embodiment of the invention. The WIM sensor 5 is installed in the road 4, across the direction of travel, with the surface of said sensor being flush with the road surface. In this arrangement, as a rule, a WIM sensor 5 only extends to the middle of the road for acquiring one side of the wheel axles, while an adjacent WIM sensor 5' extends from the middle of the road to the other road edge for acquiring the wheel loads of the wheels 2 on the other side of the axis. These WIM sensors 5, 5' together are referred to as the WIM sensor.

The device 7 for determining the speed $v(t)$ needs to be arranged in such a manner that the vehicle speed during the entire passing over of the vehicle 1 can be acquired with all the axles over the WIM sensor 5. The data $F(t)$ and $v(t)$ is transmitted to an evaluation unit 10 which synchronises the two data series $F(t)$, $v(t)$. In this context it is important that synchronisation truly composes simultaneous data series.

FIG. 4 shows a vehicle composition 1 comprising five axles. Preferably, the measuring system 12 or the measuring arrangement 13 comprises a device 11 for determining the end of a vehicle composition 1. This can, for example, be implemented in the form of a beam grid that can be established across the roadway, or in the form of induction loops that can be installed in the road surface. FIG. 4 diagrammatically shows this device 11.

As soon as the end of a vehicle composition 1 has been determined, a corresponding signal is transmitted to the evaluation unit 10. This then terminates determining weight, and prepares for weight determination of the next vehicle 1'.

Figure 5:
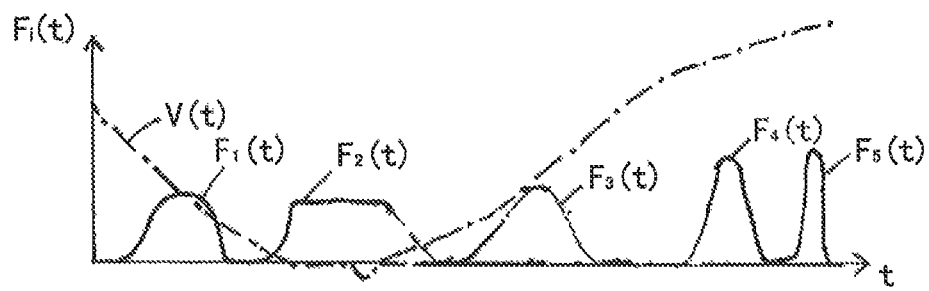
FIG. 5 an example of a time signal $F_i(t)$ of a WIM sensor while a vehicle composition is passing, with synchronised time-dependent speed values $v(t)$.

FIG. 5 shows the synchronised wheel loads $F(t)$ and $v(t)$ in relation to a vehicle composition 1 comprising five axles for one side of the vehicle. In this example the vehicle 1 has come to a standstill and rolls in reverse somewhat before accelerating to continue. In the diagram the wheel loads acquired are correspondingly wider when the vehicle moves slowly, and narrower when the vehicle moves faster, because passing over the WIM sensor then takes less time.

Figure 6:
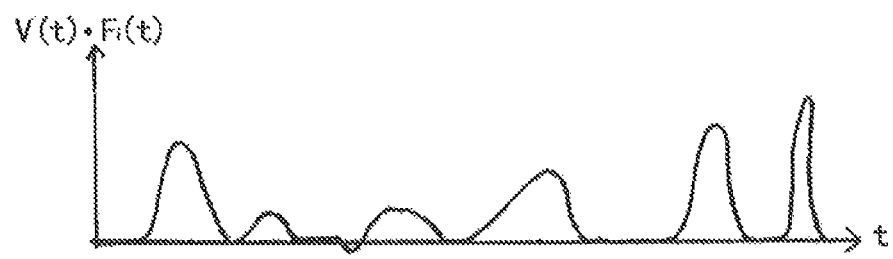
FIG. 6 weighting of the wheel loads $F_i(t)$ with the synchronised speeds $v(t)$.

FIG. 6 diagrammatically shows the product of F(t) and v(t), which corresponds to weighting of the wheel loads F(t) with the speed v(t).

To determine the weight G of the vehicle composition 1 the product of the wheel loads F(t) and of the speeds v(t) over the entire time of passing over is integrated as a whole or individually in relation to each wheel 2, and is multiplied by a calibration constant K that comprises calibration data of the WIM sensor. The weight G finally results from the sum of these results relating to all the wheels or to all the WIM sensors 5, 5' that are arranged side-by-side, and together cover the entire roadway width 4.

In a preferred embodiment the method according to the invention is characterised by the following method-related steps:

a) the wheel load $F_i(t)$ of each wheel 2 ior, in the case of twin wheels, of each twin wheel i of the vehicle 1 is individually acquired as a time function, during rolling on the road 4, by WIM (weigh-in-motion) sensors;

b) the speed v(t) of the vehicle, at least while all the wheels 2 or twin wheels i pass over a WIM sensor 5, is determined as a time function;

c) the determined wheel loads $F_i(t)$ are synchronised with the determined speed values v(t) and are multiplied by each other $F_i \cdot v$;

d) the resulting products $F_i \cdot v$ are integrated over the time dt during the entire passing over of the vehicle;

e) the integrals $I_i$ are multiplied by calibration constants $K_i$ and are added up for determining the weight G.

According to the invention the speed v(t) of the vehicle 1 can be acquired by means of radar 7. This involves simple and mature technology. As an alternative to this, said speed can also be determined by means of the laser Doppler velocimetry method. This method uses a laser 7 directed towards the vehicle, obliquely to the direction of travel, with the reflected signals of said laser 7 as a result of the Doppler effect allowing conclusions relating to the speed of the vehicle.

Figure 7:
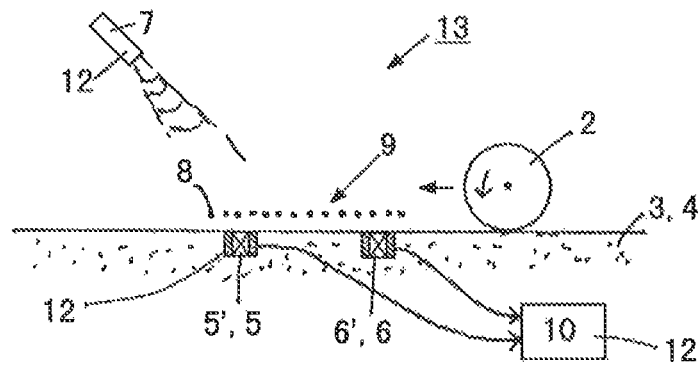
FIG. 7 a section of road with two WIM sensors and an array of beams for acquiring the speed.

As an alternative to this the vehicle speed can be acquired by means of a device comprising an array of beams 9, which array is arranged in the direction of movement of the vehicle, through which array the wheels 2 of the vehicle 1 travel in turn as they travel over the WIM sensors 5. FIG. 7 shows one example of such an array of beams 9. Preferably, the distance between the individual beams 8 in the array 9 at most corresponds to the width of the WIM sensor 5, preferably to approximately half the width of the WIM sensor 5. This ensures that as each wheel travels over the WIM sensor several speed data readings are available, irrespective of the speed of travel. In contrast to this, in the case of radar measuring, the time interval between two measuring points is always constant. Thus at a fast speed of 200 km/h far fewer speed measurements for each instance of travelling over the WIM sensor 5 are acquired than is the case at slow speeds. Even when the vehicle 1 is at a standstill the measuring rate in the case of radar readings is constant. As a result of determination of the speed by an array of beams 9, which array is arranged in the direction of travel, the number of speed readings is always constant. Consequently the accuracy of weighting of the individual wheel loads is identical in respect of all the wheels 2 and of all the vehicles 1, irrespective of the speed of travel at the time. However, care should always be taken that the array 9 is at least sufficiently long so that when a vehicle with the maximum wheel size to be assumed passes, always at least one beam 8 of the array 9 is not interrupted by a wheel 2. This ensures that the speed can always be determined with sufficient accuracy, and no system error occurs, for example as a result of the vehicle 1 having come to a standstill on the WIM sensor 5.

Preferably, by means of a device 11 it is determined which wheels/twin wheels 2 with all the trailers are to be allocated to a vehicle composition 1 in order to determine the total weight of the vehicle composition 1.

A further option for improving the accuracy of determining the weight G of a vehicle 1 can be achieved in that downstream of the WIM sensor 5, at a distance of, for example, 0.2 to 1 m, a further WIM sensor 6 is installed across the entire roadway 4 in the section of road 3. As is the case with the first WIM sensor, this second WIM sensor 6 can comprise several WIM sensors 6, 6' arranged in a row, with the totality of these sensors extending across the entire roadway 3. Hereinafter this is referred to as one WIM sensor 6, although a plurality of sensors can be involved. FIG. 7 shows a measuring arrangement 13 comprising a second WIM sensor 6.

This second WIM sensor 6 is also connected to the evaluation unit 10 for transmitting the acquired data. The speed v(t) of course needs to be acquired until such time as the last wheel 2 of the vehicle composition 1 has fully passed over the second WIM sensor 6.

Each wheel load with the associated speed is then analysed at each WIM sensor 5, 6. Depending on the plausibility of the results, a WIM sensor reading c relating to a wheel load is rejected and only the result of the other WIM measurement $F_i^2(t)$ is taken into account, or, if both results return plausible values, the average of both results is taken into account in further determining the vehicle weight g. Erroneous readings can arise, in particular, when a vehicle reverses.

According to the invention, a toll for transit can be levied based on the determined weight data G. This can, for example, take place directly, by way of a debiting system, to an electronically communicating component carried in the vehicle 1, or by way of debiting an account that can be associated with the vehicle owner by way of identification of the vehicle 1.

In this manner it is possible to establish toll plazas that conveniently can collect weight-specific toll amounts, in particular without enforced stopping or slowing-down of the vehicles 1, wherein the accuracy of weight measuring G is ensured at all speeds.

LIST OF REFERENCE CHARACTERS 1, 1' Vehicle, vehicle composition
2 Wheel, twin wheel
3 Section of road
4 Road
5, 5' Weigh-in-motion sensor; WIM sensor, row of WIM sensors
6, 6' Second WIM sensor, second row of WIM sensors
7 Device for determining the speed, radar, laser Doppler velocimetry device
8 Beam
9 Array of beams
10 Evaluation unit
11 Device for determining the end of a vehicle composition
12 Measuring system
13 Measuring arrangement
14 Length of the footprint
G Weight F(t) Time-dependent wheel load
V(t) Time-dependent speed
i Single wheel or twin wheel
I Integral of F(t) v(t)
K Calibration constant

The invention claimed is:

1. A method for determining the weight G of a vehicle travelling on a section of road and having a vehicle wheel footprint having its length measured in the direction of vehicle travel during the weight determination of the vehicle, the method comprising:
    employing a weigh-in-motion (WIM) sensor that has a width that elongates in a direction that is substantially parallel to the direction of vehicle travel during the weight determination of the vehicle and that is narrower than the length of the vehicle wheel footprint;
    using the WIM sensor in acquiring the wheel load of each wheel (i) as a time function $F_i(t)$ when the vehicle travels along the section of road;
    acquiring the speed v(t) of the vehicle as a time function simultaneously with acquiring the wheel load $F_i(t)$ of the wheel (i); and
    using the speed v(t) and the change in the speed v(t) over time as weighting of the simultaneously determined wheel load $F_i(t)$ to evaluate the data for determining the weight G.

2. The method according to claim 1, the steps according to which
    a) the wheel load $F_i(t)$ of follows:
        each wheel i in the case of a single wheel vehicle, or in the case of a vehicle with twin wheels then of each twin wheel of the vehicle with twin wheels, is individually acquired as a time function, during rolling on the road, by at least one WIM sensor;
    b) the speed v(t) of the vehicle, at least while all the wheels or twin wheels pass over a WIM sensor, is determined as a time function;
    c) the determined wheel loads $F_i(t)$ are synchronised with the determined speed values v(t) and are multiplied by each other $F_i \cdot v$;
    d) each of the resulting products $F_i \cdot v$ is integrated over the time dt during the entire passing over of the vehicle to produce the integral $I_i$; and
    e) each of the integrals $I_i$ is multiplied by its respective one of a plurality of calibration constants $K_i$ and all of these products of $I_i$ and $K_i$ are added up for determining the weight G.

3. The method according to claim 1, wherein the speed v(t) of the vehicle is acquired by means of radar or by means of the laser Doppler velocimetry method.

4. The method according to claim 1, wherein the speed v(t) of the vehicle is acquired by means of a device comprising an array of beams, which array is arranged in the direction of movement of the vehicle, through which array the wheels of the vehicle travel in turn as they travel over the WIM sensors.

5. The method according to claim 4, wherein the beams in the array are spaced apart from one another by a distance between the beams in the array that at most corresponds to the width of the WIM sensor.

6. The method according to claim 4, wherein the array is at least sufficiently long so that when the vehicle passes, always at least one beam of the array is not interrupted by a wheel.

7. The method according to claim 4, wherein the beams in the array are spaced apart from one another by a distance between the beams in the array that at most corresponds to approximately half the width of the WIM sensor.

8. The method according to claim 1, wherein any passing speeds of vehicles are admissible as passing speeds of the vehicles.

9. The method according to claim 1, wherein by means of a device it is determined which wheels/twin wheels i with all the trailers are to be allocated to a vehicle composition in order to determine the total weight of the vehicle composition.

10. The method according to claim 1, wherein the vehicle speeds v(t) and the wheel loads F(t) of all the wheels/twin wheels are acquired a second time on at least a second WIM sensor, which in the direction of travel is arranged downstream of the first WIM sensor, in order to improve the accuracy of weight determination.

11. The method according to claim 10, wherein each wheel load/twin wheel load with the associated speed is analysed at each WIM sensor and the average of both results is taken into account in further determining the vehicle weight G.

12. The method according to claim 1, wherein a toll for transit is levied based on the determined weight data G.

13. The method according to claim 1, wherein the passing speeds of vehicles can include speeds when the vehicle is in reverse.

14. A measuring system for determining the weight G of a vehicle while it is travelling on a section of road, taking into account the speed of the vehicle and its changes over time during determination of the weight of the vehicle, the measuring system comprising:
    at least one WIM sensor for installation in the section of road, which WIM sensor is configured for determining data about passing wheel loads F(t) in a time-dependent manner, and wherein the at least one WIM sensor in the direction of travel is narrower than the length of the footprint of a wheel of the vehicle;
    a device for determining data about the speed v(t) of the vehicle as a time function while the vehicle is travelling on the section of road; and
    an evaluation unit for evaluating the determined data, the evaluation unit configured for communicating with the WIM sensor and the device.

15. The measuring system according to claim 14, additionally comprising a device for determining the end of a vehicle composition that travels on a section of road and includes a beam grid that is established across the road and configured for communicating with the evaluation unit.

16. The measuring system according to claim 14, wherein the device for determining the speed of vehicle is one selected from one of the following devices for determining speed: a radar, a device measuring by means of laser Doppler velocimetry methods, and a device for generating and acquiring an array of beams.

17. The measuring system according to claim 14, additionally comprising induction loops that are installed in the road surface for determining the end of the vehicle composition that travels on the section of the road, the induction loops being configured for communicating with the evaluation unit.

18. A measuring arrangement for determining the weight G of a vehicle while it is travelling on a section of road, taking into account the speed of the vehicle and its changes over time during determination of the weight of the vehicle, comprising:

at least one WIM sensor installed in the section of road, which WIM sensor can acquire passing wheel loads F(t) in a time-dependent manner;

a device for determining the speed v(t) of a vehicle as a time function while the vehicle is travelling on the section of road;

an evaluation unit for evaluating the determined vehicle weight data and vehicle speed data, the evaluation unit being configured for communicating with the WIM sensor and the device; and wherein the WIM sensor is installed in the road across the direction of travel so that the surface of said WIM sensor is flush with the road surface, and wherein the WIM sensor is narrower in the direction of travel than the length of the footprint of a wheel of the vehicle.

* * * * *